United States Patent
McGuckin et al.

[11] Patent Number: 5,310,629
[45] Date of Patent: May 10, 1994

[54] SILVER RECOVERY ELEMENT AND METHOD

[75] Inventors: Hugh G. McGuckin; John S. Badger, both of Rochester, N.Y.

[73] Assignee: Eastman Kodak Company, Rochester, N.Y.

[21] Appl. No.: 900,810

[22] Filed: Jun. 17, 1992

Related U.S. Application Data

[63] Continuation-in-part of Ser. No. 724,310, Jun. 28, 1991, abandoned.

[51] Int. Cl.$^5$ .................. G03C 5/31; C22B 3/44
[52] U.S. Cl. ..................... 430/399; 430/398; 430/400; 430/488; 75/713; 266/170
[58] Field of Search ............ 430/398, 399, 400, 488; 75/713; 210/508; 266/170

[56] References Cited

U.S. PATENT DOCUMENTS

| | | | |
|---|---|---|---|
| 3,173,789 | 3/1965 | King et al. | 430/419 |
| 3,179,517 | 4/1965 | Tregillus et al. | 430/206 |
| 3,532,497 | 10/1970 | Goffe . | |
| 3,834,546 | 9/1974 | Brun et al. | 210/321.87 |
| 4,038,080 | 7/1977 | Fisch et al. | 430/398 |
| 4,227,681 | 10/1980 | Golben | 266/170 |
| 4,280,925 | 7/1981 | Kiefer | 252/428 |
| 4,325,732 | 4/1982 | Wong | 75/733 |
| 4,882,056 | 11/1989 | Degen et al. | 210/490 |
| 4,988,448 | 1/1991 | Wong | 210/665 |
| 5,188,662 | 2/1993 | McGuckin et al. | 75/713 |
| 5,210,009 | 5/1993 | McGuckin et al. | 430/399 |

FOREIGN PATENT DOCUMENTS

| | | |
|---|---|---|
| 64-50047 | 2/1989 | Japan . |
| 3-273235 | 12/1991 | Japan . |
| 940169 | 10/1963 | United Kingdom . |
| 1114481 | 3/1969 | United Kingdom . |

*Primary Examiner*—Charles L. Bowers, Jr.
*Assistant Examiner*—Mark F. Huff
*Attorney, Agent, or Firm*—David F. Janci

[57] ABSTRACT

A silver recovery element (10) for treating a photographic developer solution containing silver ions comprises a substrate (20) having thereon a hydrophilic colloid layer containing physical development nuclei. The invention also comprises a process for recovering silver from a photographic developer solution containing silver ions, such process comprising contacting the solution with the silver recovery element. The contacting is for a time sufficient to reduce the concentration of silver in the solution to a desired level. The recovery element and process for its use are useful in treating a seasoned photographic developer solution containing silver ions.

43 Claims, 4 Drawing Sheets

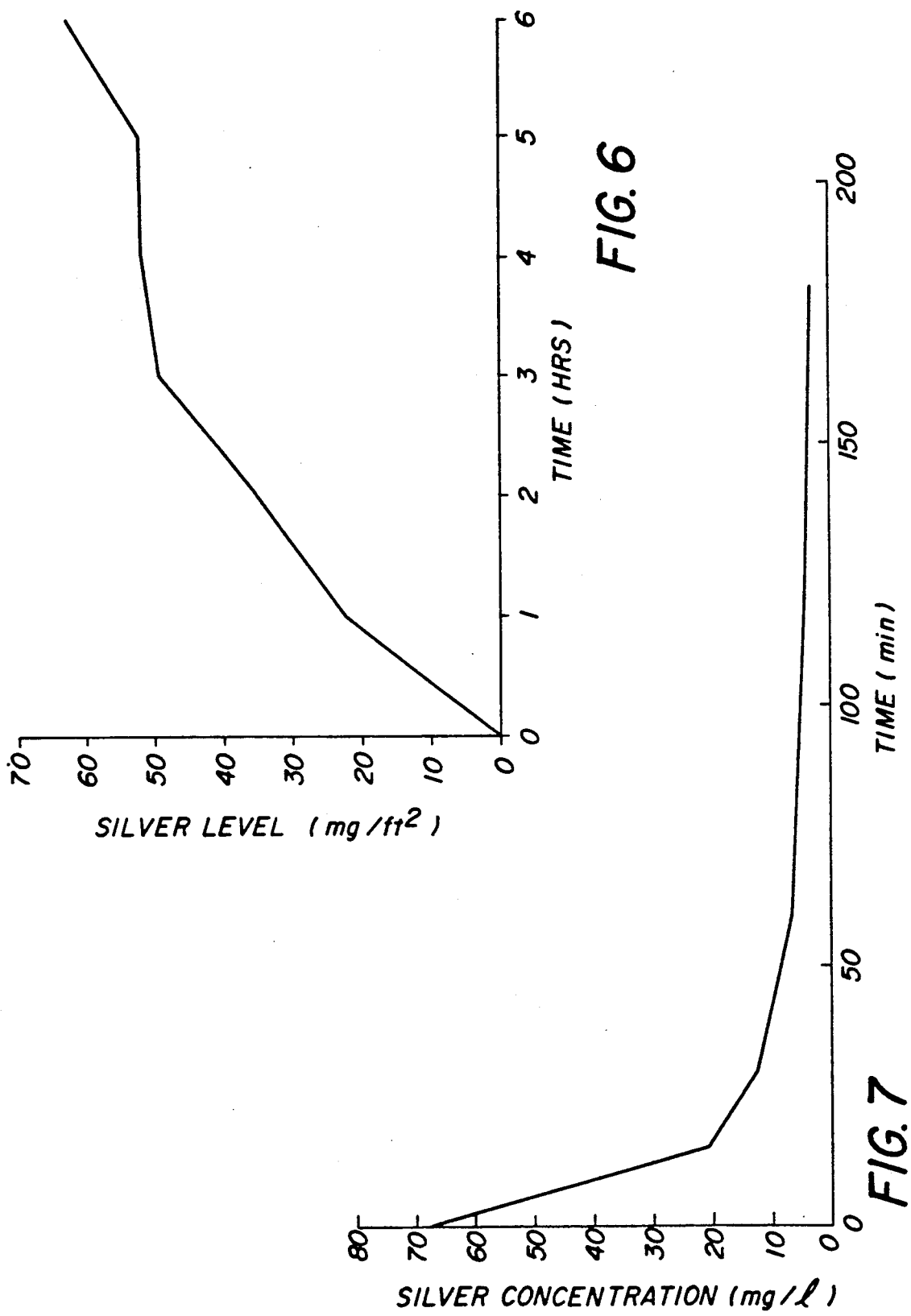

SILVER RECOVERY ELEMENT AND METHOD

CROSS REFERENCE TO RELATED APPLICATION

The subject application is a continuation-in-part of U.S. Ser. No. 724,310, filed Jun. 28, 1991 now abandoned.

FIELD OF THE INVENTION

This invention relates to an element and method for recovering silver from a photographic developer solution containing silver ions. In particular, it relates to the use of a silver recovery element comprising a water-permeable inert substrate having thereon a hydrophilic colloid layer containing physical development nuclei, which can be contacted with a photographic developer solution to recover silver from the solution.

BACKGROUND OF THE INVENTION

Photographic developer solutions can contain undesirably high amounts of silver. Silver lost in effluent streams can present an economic cost as well as an environmental discharge concern. A seasoned photographic developer solution containing silver can also contain sulfite or organic amines, which can react with silver in a photographic element to increase the amount of silver complex in solution. The silver complex tends to undergo reduction and form silver sludge. Silver sludge is a problem because it can decrease the practical useable lifetime of the developer solution. The silver sludge can foul developer apparatus such as rollers and belts and the like, and consequently foul photographic materials in contact with such apparatus, resulting in poor photographic quality. Silver sludge can also interfere with the flow of developer solution, resulting in poor photographic finish. Silver sludge formation on the developer apparatus and on the walls of the development tanks can necessitate more frequent maintenance and cleaning and result in more down time of the apparatus.

Efforts to minimize silver sludge formation have met with limited success. Some prior art methods employ the addition of mercapto or related compounds to the developer solution to inhibit the formation of silver sludge. A problem with this approach is that such additives can inhibit photographic development and decrease sensitivity. Another problem is that mercapto compounds tend to oxidize, which decreases the silver sludge-inhibiting effects.

Another prior art approach is the use of such mercapto compounds as a component in a photographic emulsion layer. This, however, can result in loss of photographic performance, such as speed and sensitivity loss.

Another prior art approach for recovering silver from a photographic developer solution employs a film having a hydrophilic colloid layer which contains a compound, such as a mercapto compound, capable of adsorbing silver. This can also have the above-noted problems concerning mercapto or related silver adsorbing compounds.

Also known is the use of physical development nuclei (sometimes termed active nuclei), such as Carey Lea Silver, as silver precipitating agents. They can be used to cause silver sludge to settle to the bottom of a development tank. This approach, however, does not result in satisfactorily decreasing, or eliminating, the problem of silver sludge formation.

Another prior art approach is to provide a silver precipitating layer in a photographic element having an image-forming silver halide layer. The silver precipitating layer, which can comprise a hydrophilic colloid containing metal sulfides or colloidal metals, e.g. Carey Lea silver, can decrease the migration of silver or silver halide and lessen silver buildup in a photographic developer solution. A problem with this approach is that silver and silver halide captured in the precipitating layer can impede light transmission and result in decreasing the photographic quality of the exposed film and developed image.

Also known is to provide a processing element comprising a hydrophilic element containing a dispersed silver-precipitating agent, for example a physical development nuclei such as Carey Lea silver. Such a processing element can be employed in a diffusion transfer photographic development process. When it is used, however, in association with a photographic support such as poly(ethylene terephthalate), the penetrability of developer solution in the processing element may be limited and thus limit its usefulness for recovering silver from solution.

RELATED ART

U.S. Pat. No. 3,179,517 discloses a processing element comprising a hydrophilic element, with or without a support, containing dispersed silver-precipitating agent, e.g. physical development nuclei such as Carey Lea silver.

U.S. Pat. No. 3,173,789 discloses a method and composition for inhibiting silver sludge in thiosulfate monobaths by using mercapto compounds in the monobath composition.

U.S. Pat. No. 3,532,497 discloses the preparation of physical development nuclei, such as nickel sulfide.

U.S. Pat. No. 4,325,732 discloses a metal recovery apparatus and method employing an exchange mass within which is dispersed particles of a replacement metal.

U.S. Pat. No. 4,227,681 discloses a silver recovery cartridge having a metallic filler and a porous pad thereon.

U.S. Pat. No. 4,882,056 discloses a fluid treatment element comprising a permeable cartridge with a permeable core on which is disposed polymeric microfibers.

U.S. Pat. No. 4,038,080 discloses a desilvering method in which metallic silver or other particulate material can be added to a silver containing solution to supply nucleating sites for the silver in solution.

U.S. Pat. No. 3,834,546 discloses a semi-permeable fluid separation apparatus comprising a core, a textile sheath, and a semi-permeable membrane.

U.S. Pat. No. 4,988,448 discloses a method and apparatus for removing constituents from a waste solution, which apparatus comprises a cylindrical housing with an inlet, an outlet, and a filter material such as rolled fiberglass.

Jap. Published Patent Appl'n. 89-50047 discloses a cleaning film and method for preventing the production of silver sludge in a development solution. The cleaning film is described as having a hydrophilic colloid layer which contains a compound that can adsorb silver ions or silver metal above a substrate. It does not describe Applicants' method or assembly employing a media containing physical development nuclei to treat developer solutions.

Jap. Published Patent Appl'n. 3-273235 discloses a photographic processing method using a filter prepared by dipping a filter member, such as fiber-type cellulose, into a colloidal solution of metal or metallic sulphide acting as a physical development nucleus. Alternatively, the filter is prepared by contacting the filter member with the reacting solution during the filtering reaction to prepare the colloid solution. It also describes filtering a developing bath containing a sulfite through the filter by which silver ions or complexes in the developing bath can undergo physical development.

U.K. 940,169 discloses developer additive compounds for preventing the formation of precipitates in photographic developers.

U.K. 1,144,481 discloses a monobath solution comprising o-mercaptobenzoic acid to control the formation of sludge.

SUMMARY OF THE INVENTION

The invention provides a silver recovery element for recovering silver from a photographic developer solution containing silver ions. The element comprises a water-permeable inert substrate having thereon a hydrophilic colloid layer containing physical development nuclei. The hydrophilic colloid layer can be gelatin. The element can comprise a string filter wherein the substrate is string.

In one embodiment of the invention wherein the element comprises a string filter wherein the substrate is cotton string, the physical development nuclei is Carey Lea silver in an amount of from about 1 mg silver per gram of string to about 10 mg silver per gram of string. In another such embodiment, Carey Lea silver is employed in an amount of about 4 mg silver per gram of string. The Carey Lea silver can have an average pretreatment diameter in the range of from about 10 Å to about 500 Å.

The invention also comprises a process for recovering silver from a photographic developer solution containing silver ions. The process comprises contacting the solution with the silver recovery element described in the preceding paragraph. The contacting can be carried out for a time sufficient to reduce the concentration of silver in the solution to a desired level.

The invention has several advantages over prior art methods directed towards the problem of silver sludge formation in photographic developer solutions. The invention provides a material which when immersed in a developer solution serves as a catalytic surface for the physical development of complexed silver ion which would otherwise form silver sludge. It does not require the introduction into the developer solution of silver precipitating agents that can adversely affect photographic performance or development of the latent image. The invention restrains the plating out of silver on the surfaces of the developer tank and transport rollers.

The element and process of the invention also provide good silver removal to prolong the useful life of the developer solution and prevent the rapid change in solution color associated with the formation of silver sludge. It delays the need for cleaning the developer tank and rollers with a systems cleaner. It is compatible with a wide variety of photoprocessing machines. The silver recovery element when employing a string filter or the like as the substrate can also function as a physical trap or filter to remove undesirable particulate materials from solution. The materials comprising the recovery element are also readily available and economic to use.

BRIEF DESCRIPTION OF THE DRAWINGS

FIG. 6 is a graph of silver level in a silver recovery element versus treatment time for a comparison silver recovery element.

FIG. 7 is a graph of silver concentration in a seasoned developer solution versus treatment time for a silver recovery element of the invention.

DESCRIPTION OF PREFERRED EMBODIMENTS

The present invention provides a silver recovery element for recovering silver from a photographic developer solution containing silver ions, such element comprising a water-permeable inert substrate, the substrate having thereon a hydrophilic colloid layer containing physical development nuclei.

The present invention also comprises a process for recovering silver from a photographic developer solution containing silver ions, such process comprising contacting the solution with a silver recovery element, the element comprising a water-permeable inert substrate, the substrate having thereon a hydrophilic colloid layer containing physical development nuclei; and the contacting being for a time sufficient to reduce the concentration of silver in the solution to a desired level.

The silver recovery element can comprise a flow-through filter comprising a cylinder having a hollow core therethrough, the cylinder having an outer surface and an inner surface and having flow channels therethrough, and having the substrate positioned on the outer surface of the cylinder. Alternatively, the substrate can be positioned in the hollow core, either without or with a substrate positioned on the outer surface. In the latter embodiment, the substrate positioned in the core can either be the same or a different material than the substrate positioned on the outer surface.

The silver recovery element can be positioned inside a housing, the housing having an inlet port and an outlet port for respectively providing solution to and discharging solution from the housing.

In defining the substrate as water-permeable it is meant that the substrate with the hydrophilic colloid layer thereon must be penetrable to an aqueous photographic developer solution, that is, it must permit the flow of solution through the recovery element. The substrate itself can thus be hydrophobic if it can retain the colloid layer thereon and as such be penetrable to the solution. It is preferable, however, that the substrate be hydrophilic to allow good penetration of solution through uncoated portions of substrate surfaces as well as better penetration through coated portions, so that solution flow is optimized and solution more efficiently contacted with the recovery element.

Figure 1:
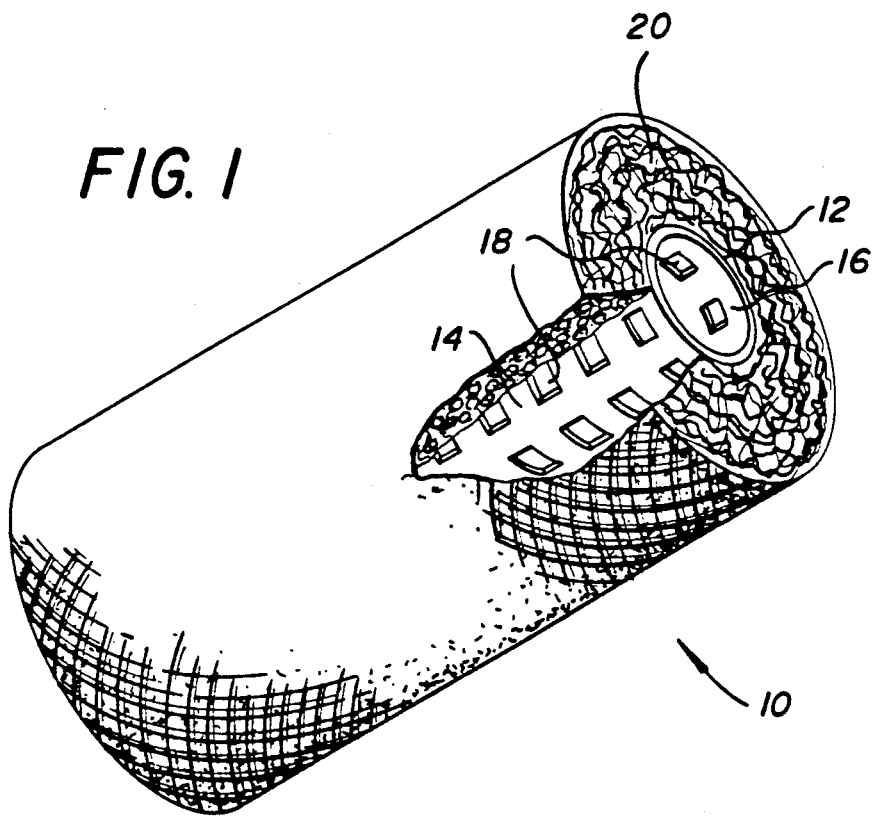
FIG. 1 is an enlarged, cross-sectional view of a commercially available string filter, with the string layer partially cutaway to better illustrate details of the filter.
Figure 2:
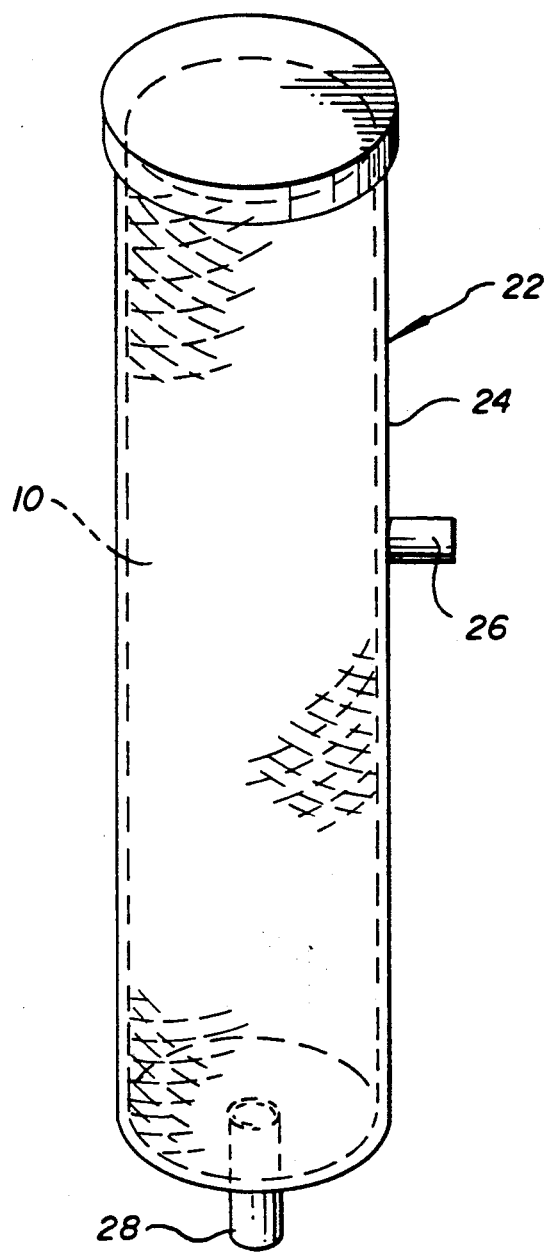
FIG. 2 is an enlarged, schematic view of a silver recovery canister with the silver recovery element shown in phantom.

The substrate must also be inert, that is, substantially nonreactive with the colloid, the physical development nuclei, and the developer solution, such that such components would not tend to chemically dissociate and/or break down. One skilled in the art can select a substrate that will be inert. Other factors affecting choice of substrate can include porosity and absorbance. One skilled in the art can also select a substrate having such desired characteristics, e.g. porosity, absorbance, and low cost, to achieve the performance desired such as solution flow rate and silver recovery rate, as further described below. In one embodiment, the inert substrate is string, as described below and in the Examples and as illustrated in FIGS. 1 and 2. Alternatively, the inert substrate can comprise paper, which can be cellulose or a suitable hydrophilic material, or a woven or spunwoven material, e.g. cotton, a cotton blend, or another cloth material.

The substrate has thereon the hydrophilic colloid containing the physical development nuclei, and what is meant by the term "has thereon" or the term "having thereon" as employed herein is that the substrate can have the colloid either impregnated therein, adhered thereon, or both. In particular, when employing a string filter, the colloid can be on the surface of the string, impregnated into the string, and/or adsorbed into the string. One skilled in the art can select a substrate material having a suitable adsorbence to imbibe the hydrophilic colloid and having a porosity sufficient to allow the desired flow rate of solution through the substrate. An appropriate substrate and colloid can also be selected so the colloid adheres to the substrate surface, and a hardener can be employed to improve such adherence. For example, when using a string filter comprising cotton string, the colloid can comprise a gelatin, for example a bone-derived gelatin as is well known in the photographic arts, and can also comprise a hardener for improved adherence and to avoid dissolution of the nuclei-containing gelatin. A hardener can alternatively be employed in the developer solution, as is common practise with radiographic elements and developers, or in both the colloid and the solution.

The physical development nuclei can comprise any suitable well-known agent which does not exert adverse effects on the photographic element. Physical development nuclei are well known in the art, e.g., as set forth in U.S. Pat. Nos. 3,737,317 and 3,179,517. Typical physical development nuclei useful in the practise of the invention include metal sulfides, metal selenides, metal polysulfides, metal polyselenides, stannous halides, heavy metals and heavy metal salts and mixtures thereof. Heavy metal sulfides such as lead, silver, zinc, antimony, cadmium and bismuth sulfides are useful.

Heavy metals, e.g. noble metals, are useful as physical development nuclei in the invention, such as silver, gold, platinum, and palladium and mixtures thereof, preferably in the colloidal form. In one embodiment the noble metal can comprise particles of colloidal silver, such as Carey Lea silver.

The amount of physical development nuclei in the substrate can be selected based on factors such as substrate properties, e.g. adsorbency and porosity, cost of fabrication of the recovery element, and desired removal efficiency of the element. In one embodiment of the invention wherein the element comprises a string filter wherein the substrate is cotton string, the physical development nuclei is Carey Lea silver in an amount of from about 1 mg silver per gram of string to about 10 mg silver per gram of string. In another such embodiment, Carey Lea silver is employed in an amount of about 4 mg silver per gram of string.

As stated above, metal sulfides, such as nickel sulfide, are useful physical development nuclei of the invention. In one embodiment in which the substrate is a string filter, the physical development nuclei comprises nickel sulfide in a weight proportion in the range of from about 5 to about 800 micrograms nickel sulfide per gram of string. A preferred weight proportion of nickel sulfide is in the range of from about 30 to about 120 micrograms nickel sulfide per gram of string.

The size of the physical development nuclei can be selected based on performance factors for the particular type of physical development nuclei selected. For example, Carey Lea silver nuclei having an average pre-treatment diameter in the range of from about 10 Å to about 500 Å are useful as physical development nuclei in the invention. By "average pre-treatment diameter" is meant the average diameter of Carey Lea silver nuclei prior to the use of the silver recovery element to treat a silver-containing solution. During treatment the average diameter should increase because silver is removed from solution and accumulates on or near the Carey Lea silver nuclei. Too low a diameter can have the effect of increasing the time to remove the desired amount of silver from solution. Too high a diameter can limit the effectiveness of the element in removing silver. A preferred average pre-treatment diameter is about 300 Å.

The hydrophilic colloid layer can comprise a hydrophilic colloid such as those disclosed in *Research Disclosure*, Kenneth Mason Publications, Ltd., Emsworth, England, Volume 308, December 1989, Item 308119, section IX. Useful hydrophilic colloids include proteins, gelatin, and polysaccharides such as dextrin, to name but a few. In one embodiment of the invention, bone-derived gelatin is the hydrophilic colloid.

Typically, the hydrophilic colloid layer is cross-linkable and can further comprise a hardener as noted above. Alternatively or additionally, a hardener can be added to the developer solution. One skilled in the art can readily select a hardener that is compatible with the particular hydrophilic colloid, and when a different hardener is employed in the colloid layer and the developer solution, hardeners that are mutually compatible should be selected. Typical useful hardeners are those such as are disclosed in *Research Disclosure*, Volume 308, Item 308119, section X; bis vinylsulfonylmethyl ether, disclosed in U.S. Pat. No. 3,841,872 U.S. Pat. No. Re. 29,305), Burness et al, is a useful hardener in the hydrophilic colloid layer.

The solution being treated by the element and process of the invention is a photographic developer solution containing silver ions. The photographic developer solution can be seasoned or unseasoned.

When carrying out the process of the invention, the step of contacting the developer solution with the silver recovery element should be for a time sufficient to reduce the concentration of silver in the developer solution to a desired level. The desired final silver concentration and treatment time are readily determinable by the operator, and can be influenced by factors such as solution flow rate, starting silver concentration, and the efficiency and coating coverage of the physical development nuclei. In one embodiment, the treatment time to reduce silver concentration from about 70 mg/liter to about 8 mg/liter is about 1 hour.

The process can be carried out at a temperature in the range of from about 50° F. (10° C.) to about 120° F. (48.9° C.). A preferred process temperature is in the range of from about 70° F. (21.1° C.) to about 100° F. (37.8° C.). The process can be conducted at any pressure in the range of from about atmospheric pressure for a stated set of reaction conditions to about 100 atmospheres.

The recovery element and process described hereinabove are further illustrated in FIGS. 1 and 2 that schematically illustrate an embodiment of the invention. Referring first to FIG. 1, recovery element 10 comprises hollow cylinder 12, having outer surface 14 and inner surface 16 and a plurality of holes 18 therethrough to allow solution to flow from the outside to the inside of cylinder 12 or vice versa. String winding 20 is positioned on outer surface 14 as a substantially uniformly thick layer. String winding 20 has thereon a hydrophilic colloid layer containing physical development nuclei (not illustrated).

FIG. 2 illustrates recovery element 10 snuggly positioned in silver recovery canister 22. Canister 22 comprises housing 24 having ports 26 and 28 for the respective intake and discharge of solution, or alternatively for the respective discharge and intake of solution. Sealing means (not illustrated) provide a substantially bypass-free flow of solution through recovery element 10. That is, solution entering canister 22 cannot flow around recovery element 10 without passing through string winding 20. Solution thus enters canister 22 through port 26, flows through string winding 20, then flows through holes 18, and discharges as treated solution through port 28. Alternatively, some bypass flow around recovery element 10 can be allowed, for example by employing partial sealing means or a gap between canister 22 and one or both ends of recovery element 10, so that not all the solution entering canister 22 flows through string winding 20.

Figure 3:
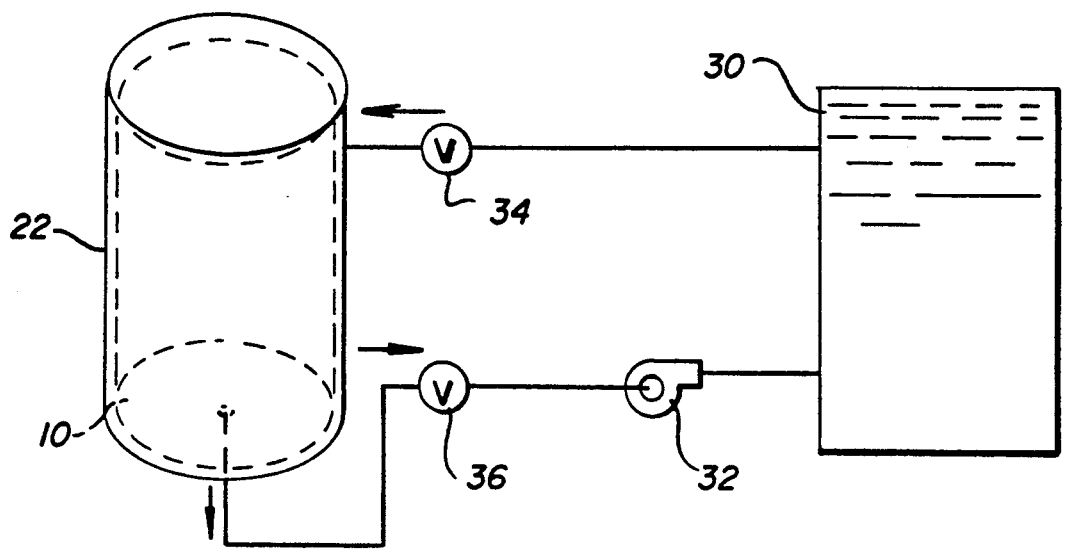
FIG. 3 is a system diagram illustrating a string filter and other system components.

FIG. 3 illustrates a photoprocessing developer recirculation system containing a silver recovery element of the invention, developer solution flow being indicated by the direction arrows. Developer solution is provided to film developer tank 30 by recirculating pump 32. The developer solution flows through tank 30 in which exposed photographic film can be developed, through optional flow control valve 34, and to silver recovery canister 22 that contains recovery element 10. After flowing through recovery element 10, developer solution is recirculated through optional flow control valve 36 back to pump 32. As stated above, the invention may also be practised without tank 30, that is, by just circulating developer solution through silver recovery canister 22.

Figure 4:
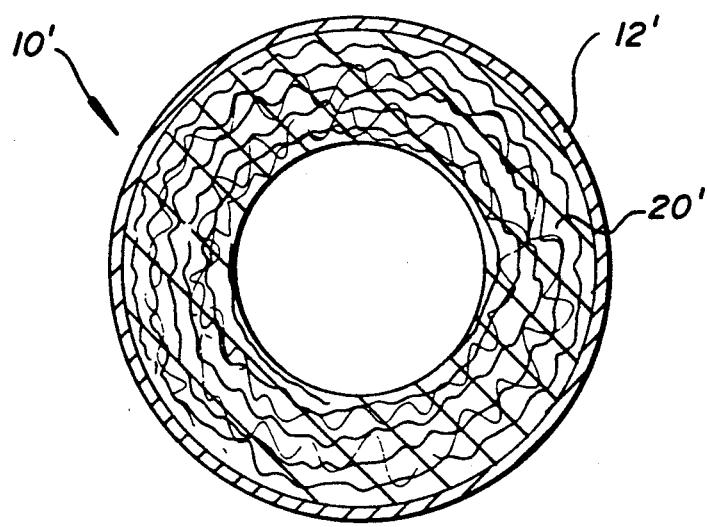
FIG. 4 is a cross-sectional view of a filter having a substrate positioned in the core.

FIG. 4 is illustrative of another embodiment of a silver recovery element 10' in which substrate 20', for example a string substrate, is positioned inside hollow cylinder 12', and other structural elements or details otherwise conform to those as described above for element 10.

The invention is further illustrated by the following examples of its practice.

EXAMPLE 1

A 7 mil (0.18 mm) thick poly(ethylene terephthalate) support was coated with the following formulation:

2000 mg/ft$^2$ (2.15 mg/cm$^2$) of 12.5% by weight photographic grade gelatin dispersion 20 mg/ft$^2$ (215.29 mg/m$^2$) of 2.0% by weight solution of bisvinylsulfonyl methylether (hardener)

40 mg/ft$^2$ (430.57 mg/m$^2$) of 4.9% Carey Lea silver in a 9 percent by weight of photographic grade gelatin dispersion To season a developer solution, ten unexposed 8" by 10" sheets of KODALINE ™ Rapid Film were individually tray processed at 110° F. (43.3° C.) in 400 ml of Kodak RA-2000 developer solution for 60 seconds with continuous agitation. The initial silver ion concentration of the seasoned developer solution was then determined by atomic absorption analysis at 70° F. (21.1° C.) to be 80 mg/liter. 50 ml of the seasoned developer solution was then added to a plastic container containing the coated support and the solution was stirred.

Figure 5:
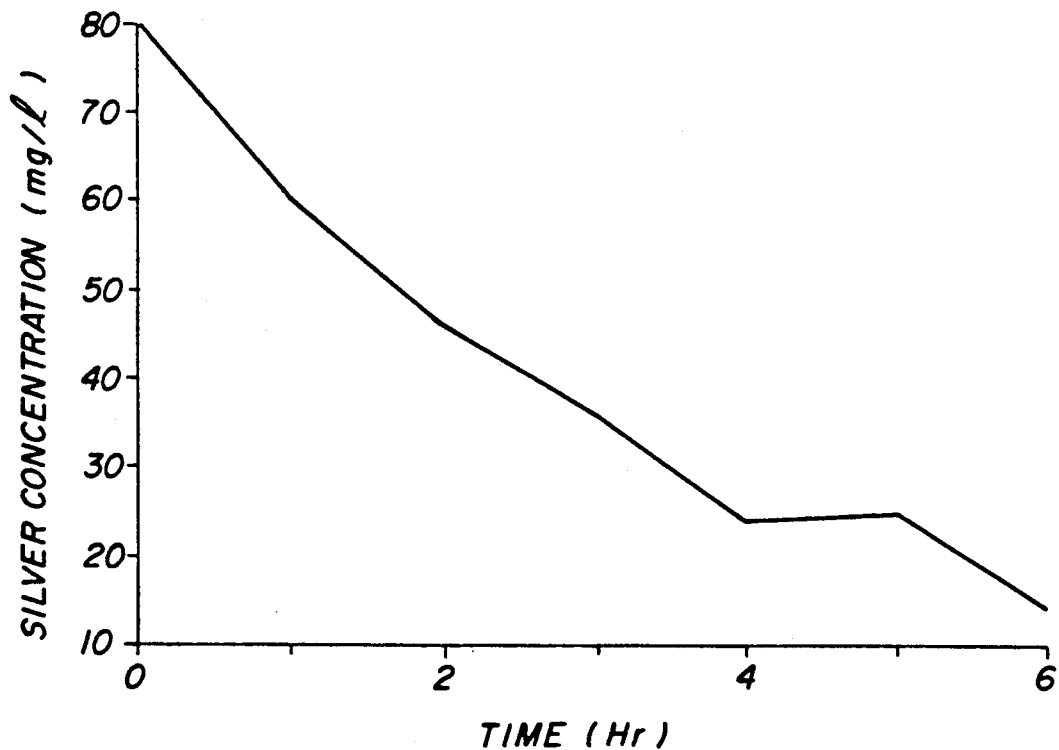
FIG. 5 is a graph of silver concentration in a seasoned developer solution versus treatment time for a comparison silver recovery element.

The silver concentration in solution was obtained by atomic absorption at 70° F. (21.1° C.) after 1, 2, 3, 4, 5, and 6 hours. The results are shown in FIG. 5. The silver concentration decreased from 80 mg/liter down to 14 mg/liter over the 6 hour period.

The amount of silver physically developed in the coated support was measured by atomic absorption at 70° F. (21.1° C.) and found to be 22.5 mg/ft$^2$ (242.20 mg/m$^2$) after 1 hour and 63.0 mg/ft$^2$ (678.15 mg/m$^2$) after 6 hours, demonstrating that as silver is removed from the developer solution it is physically developed in the coated support. The results are shown in FIG. 6.

EXAMPLE 2

Another type of physical development nuclei, nickel sulfide, was also tested. A 4 mil (0.10 mm) thick subbed poly(ethylene terephthalate) support was coated with the following formulation:

2000 mg/ft$^2$ (2.15 mg/cm$^2$) of 12.5% by weight photographic grade gelatin dispersion 20 mg/ft$^2$ (215.29 mg/m$^2$) of 2.0% by weight solution of bisvinylsulfonyl methylether (hardener)

0.6 mg/ft$^2$ (6.46 mg/m$^2$) of nickel sulfide with stabilizer, prepared such as is described in U.S. Pat. No. 3,532,497, Ex. 2, incorporated herein by reference.

To season a developer solution, thirty unexposed 8" by 10" sheets of KODALINE ™ Rapid Film were individually tray processed at 110° F. (43.3° C.) in 1 liter of Kodak RA-2000 developer solution for 60 seconds with continuous agitation. Two hundred milliliters of the seasoned developer solution were introduced into each of four beakers. A 15.2 cm×3.5 cm sample of the coated support was coiled and placed in the developer solution in each beaker. Each developer solution was stirred at about 800 rpm using a Sybron Thermolyne Multi-Stir Plate "4".

The silver concentration in solution was obtained by atomic absorption at 70° F. (21.1° C.) initially and at 1, 2and 3 hours. Silver analyses were also obtained for each of the coating samples by X-ray fluoresence initially and at 1, 2, and 3 hours. The results are shown in Table 1, below. The silver concentration in solution decreased from 69.9 mg/liter to 51.4 mg/liter over the 3 hour period. The amount of silver physically developed in the coated support increased from 0 to 60.4 mg/ft$^2$ (242.20 mg/m$^2$) after 1 hour and 63.0 mg/ft$^2$ (650.17 mg/m$^2$) after 3 hours, demonstrating that as silver is removed from the developer solution it is physically developed in the coated support.

The results show that a physical development nuclei other than Carey Lea silver, e.g. nickel sulfide, is effective for recovering silver from solution.

TABLE 1

| Time (hours) | Silver Concentration in Developer Solution (mg/liter) | Silver Level in Coated Sample (mg/m$^2$) |
|---|---|---|
| Initial | 69.6 | 0 |
| 1 | 61.6 | 33.7 |
| 2 | 55.5 | 48.9 |
| 3 | 51.4 | 60.4 |

EXAMPLE 3

A silver recovery element as illustrated in FIGS. 1 and 2 was provided for treating a seasoned developer solution in a silver recovery system as illustrated in FIG. 3 but without the developer tank. The recovery element was a string filter, a Filterguard obtained from Stonehand Industries, Inc., Lakewood, Co., having a polypropylene core wound with bleach cotton string having a maximum average pore size of about 20 microns.

The string filter was impregnated with an aqueous solution having the following ingredients:
240 g of 12.5% by weight photographic grade gelatin dispersion
36 g of 4.9% Carey Lea silver in a 9 percent by weight of photographic grade gelatin dispersion
30 g of 2.0% by weight solution of bisvinylsulfonyl methylether (hardener)
6 g of 10.0% by weight solution of Olin surfactant 10G distilled water to a total weight of 600 g The impregnation was carried out by first immersing the string filter in the nuclei solution at 40° C. After 30 minutes the filter was removed and the excess solution allowed to drain from the string windings. The filter was then placed in an upright position in a plastic petrie dish and allowed to dry at room temperature. The filter then contained about 4 mg of silver per gram of string.

The silver recovery capability of the element so prepared was tested as follows. To season a developer solution, ten unexposed 8' by 10' sheets of KODALINE ™ Rapid Film were individually tray processed at 110° F. (43.3° C.) in 400 ml of Kodak RA-2000 developer solution for 60 seconds with continuous agitation by rocking. This procedure was repeated with ten additional 8' by 10' sheets of the same film in 400 ml of the same developer solution and the two such solutions combined to yield 800 mL of seasoned developer. The silver ion concentration of the seasoned developer solution was then determined by atomic absorption analysis to be 59.8 mg/liter.

600 ml of the seasoned developer solution was circulated in the silver recovery system for 3 hours at 70° F. (21.1° C.) at a flow rate of 3.3 liter/minute. After 3 hours the silver concentration in the developer solution was measured by atomic absorption to be 1.5 mg/liter.

EXAMPLE 4

The procedure of Example 3 was carried out, except that the formulation of the aqueous solution containing the Carey Lea silver was as follows:
240 g of 12.5% by weight photographic grade gelatin dispersion
36 g of 4.9% Carey Lea silver in a 9 percent by weight of photographic grade gelatin dispersion
22.5 g of 2.0% by weight solution of bisvinylsulfonyl methylether (hardener)
6 g of 10.0% by weight solution of Olin surfactant 10G distilled water to a total weight of 600 g The only change in the formulation from that of Example 3 is that the amount of hardener was decreased. Also, 10 ml samples of developer solution were analyzed for silver concentration initially and at 15 minutes, 30 minutes, 1 hours, 2 hours, and 180 minutes following the start of the treatment procedure. The results are shown in Table 2, below, and in FIG. 7.

TABLE 2

| Time (minutes) | Silver Concentration (mg/liter) |
|---|---|
| 0 | 68.7 |
| 15 | 20.7 |
| 30 | 12.1 |
| 60 | 6.4 |
| 120 | 4.4 |
| 180 | 3.2 |

The test results in Examples 3 and 4 show good silver recovery for the recovery element and process of the invention as shown by the demonstrated decrease in silver concentration of the developer solution. Examples 3 and 4 also demonstrate better silver recovery than the comparison Example 1, as shown by the better rate of decrease of silver concentration.

EXAMPLE 5

A string filter impregnated with nickel sulfide nuclei was prepared using a coating solution having the following formulation:
240 g of 12.5% by weight photographic grade gelatin dispersion
71.0 g of aqueous 0.002 molar nickel sulfide nuclei peptized in an aqueous gelatin solution
30.0 g of 2.0% by weight solution of bisvinylsulfonyl methylether
6 g of 10.0% by weight solution of Olin surfactant 10G (nonylphenol polyglycidol 10)
distilled water to a total weight of 600 g The solution was imbibed into a string filter (bleached cotton, 20 μm FILTERITE, FIG. 1 and FIG. 2) by immersion at 40° C. for one minute, allowed to drain for two minutes, then inverted and placed on foil to drain overnight. The filter was then transferred to a film dryer at 100° F. and held for 72 hours. The string filter thus prepared contained nickel sulfide nuclei in the amount of about 60 mg per gram of string.

The filter was then placed in a standard 5 inch housing and the element placed in a recirculating loop as shown in FIG. 3. The silver recovery capability of the element was tested as follows. To season a developer solution, ten unexposed 8" by 10" sheets of KODALINE Rapid Film were individually tray processed at 100° F. (43.3° C.) in 400 ml of Kodak RA-2000 developer solution for 60 seconds each using continuous agitation. This procedure was repeated with ten additional 8" by 10" sheets of the same film in 400 ml of the same developer solution and the two batches combined to yield 800 mL of seasoned developer. The 800 ml of seasoned developer solution was circulated in the silver recovery system for 3 hours at 70° F. (21.1° C.) at a flow rate of 3.3 liter/minute, and the silver ion concentration of the seasoned developer solution was determined at regular intervals by atomic absorption. The results are shown in Table 3.

TABLE 3

| Time (minutes) | Silver (mg/L) | Percent Decrease in Silver in Solution |
| --- | --- | --- |
| 0 | 50.0 | 0 |
| 15 | 6.0 | 88 |
| 30 | 3.7 | 93 |
| 60 | 2.3 | 95 |
| 90 | 2.0 | 96 |
| 120 | 1.9 | 96 |
| 180 | 1.6 | 97 |

The results show that the string filter containing 60 μg of nickel sulfide nuclei per gram of string is effective as a silver recovery element.

EXAMPLE 6

The procedure of Example 5 was repeated with the exception that 35.5 g of NiS nuclei peptized in the gelatin medium was used, and the resulting string filter contained 30 μg of nickel sulfide nuclei per gram of string. The results are shown in Table 4.

TABLE 4

| Time (minutes) | Silver (mg/L) | Percent Decrease in Silver in Solution |
| --- | --- | --- |
| 0 | 58.2 | 0 |
| 15 | 16.9 | 71 |
| 30 | 5.2 | 91 |
| 60 | 3.1 | 95 |
| 120 | 2.8 | 95 |
| 180 | 2.3 | 96 |

The results show that the string filter containing 30 μg of nickel sulfide nuclei per gram of string is less effective initially than in Example 5, but with time is substantially as effective.

EXAMPLE 7

The procedure of Example 5 was repeated with the exception that 142.0 g of NiS nuclei peptized in the gelatin medium was used, and the resulting string filter contained 120 μg of nickel sulfide nuclei per gram of string. The results are shown in Table 5.

TABLE 5

| Time (minutes) | Silver (mg/L) | Percent Decrease in Silver in Solution |
| --- | --- | --- |
| 0 | 59.8 | 0 |
| 15 | 17.1 | 71 |
| 30 | 6.5 | 89 |
| 60 | 5.8 | 90 |
| 90 | 4.8 | 92 |
| 120 | 4.6 | 93 |
| 180 | 4.0 | 94 |

The results show that the string filter containing 120 μg of nickel sulfide nuclei per gram of string is comparable in effectiveness initially but that it has slightly lower effectiveness over the longer time interval tested.

In Examples 8 and 9, tests were run to determine the thermal stability of a string filter containing physical development nuclei with respect to hardener concentration, and are as follows.

EXAMPLE 8

An aqueous solution containing Carey Lea silver nuclei was prepared using the following formulation:
240 g of 12.5% by weight photographic grade gelatin dispersion
36 g of 4.9% Carey Lea silver in a 9 percent by weight of photographic grade gelatin dispersion
30 g of 2.0% by weight solution of bisvinylsulfonyl methylether (hardener)
6 g of 10.0% by weight solution of Olin surfactant 10G
distilled water to a total weight of 600 g The BVSME hardener concentration calculates out to be 20 mg/g of gel. A string filter and recovery element were prepared using the procedure of Example 5. The element was positioned in a recirculating system as shown in FIG. 3, and the developer circulated through the system starting at 90° F. (21.1° C.) and increased to a final temperature of 140° F. At each 10° F. increase in temperature the solution was allowed to flow for about one hour. The experiment was conducted over a 2 day period. Fresh developer was made at the start of each day. Samples of developer were taken initially and after one hour of circulation at the designated temperature. These samples were submitted for silver analysis by atomic absorption. The results are shown in Table 6.

TABLE 6

|  | Target Temp (°F.) | Actual Temp (°F.) | Ramp Time (min) | Time @ Temp (min) | Silver (mg/L) |
| --- | --- | --- | --- | --- | --- |
| Day 1 | ambient | N/A | N/A | N/A | 0.2 |
|  | 90 | 91.0 | 60 | 60 | 0.3 |
|  | 100 | 98.4 | 30 | 90 | 0.3 |
|  | 110 | 110.0 | 20 | 60 | 0.4 |
|  | 120 | 120.0 | 30 | 60 | 0.6 |
| Day 2 | ambient | N/A | N/A | N/A | 0.3 |
|  | 120 | 120.3 | 60 | 60 | 0.3 |
|  | 130 | 131.2 | 40 | 100 | 0.4 |
|  | 140 | 141.0 | 30 | 60 | 1.0 |

The results indicate good stability of the coating up to 130° F. A slight but significant increase in the detected silver was noted at 140° F. after one hour of circulation.

EXAMPLE 9

Three string filters, Filters 1, 2, and 3, were prepared as in Example 8 except that the concentration of hardener was 20 mg/g gel, 33 mg/g gel, and 47 mg/g gel, respectively. A thick line was applied to each filter using a Berol Hi-Temp Marking Pencil. The filters were suspended in a 600 mL beaker containing 400 mL of distilled water by inserting a digital temperature probe into a rubber stopper that was in turn inserted into the center core of the string filter. This arrangement allowed the water temperature to be monitored while allowing about two inches of the filter to remain submerged. Heat settings on the Thermolyne 13000 Multiplate stirring hot plate was at 300° F. and stirring was at 200 RPM. Time and temperature were noted at the first sign of loss of adhesion and again when the entire marking was gone. At approximately 200° F., a sample of water was taken and submitted for silver analysis by atomic absorption. The results are shown in Table 7.

TABLE 7

| Filter | BVSME mg/g gel | Start Time | Initial Temp (°F.) | End Time | Final Temp (°F.) | Silver mg/L |
| --- | --- | --- | --- | --- | --- | --- |
| 1 | 20 | 12' 30" | 170 | 22' 30" | 208 | 0.7 |
| 2 | 33 | 15' 00" | 180 | 25' 00" | 211 | 0.5 |
| 3 | 47 | 17' 00" | 185 | 27' 00" | 211 | 0.5 |

The results indicate that increased hardener results in an increased melting point and increased thermal stability of the string filter recovery element.

The present invention can be advantageously employed in treating photographic developer solutions containing silver ion. It provides significant benefits. For example, it does not require the introduction into a developer solution of silver precipitating agents that can adversely affect photographic performance or development of the latent image. The element and process of the invention provide good silver removal to prolong the useful life of the developer solution. It does not require deploying a silver recovery layer in a photographic element itself, which can adversely affect the photographic quality of the developed, exposed film. The silver recovery element when employing a string filter or the like as the substrate can also function as a physical trap or filter to remove undesirable particulate materials from solution.

The element and process of the invention are useful in removing silver from a photographic developer solution that could otherwise form silver sludge and foul the recirculator for the developer solution and other developer apparatus. This can result in improved performance of such apparatus, e.g. decreased time out of service and decreased maintenance. Improved flow of the developer solution through the filter can also result, leading to higher photographic quality of the exposed, developed film. The invention is also useful in removing silver that might otherwise contaminate an effluent stream and thus can help meet environmental discharge limits.

This invention has been described above with particular reference to preferred embodiments. A skilled practitioner familiar with the detailed description above, can make many substitutions and modifications without departing from the scope and spirit of the appended claims.

We claim:

1. A silver recovery element for recovering silver from a photographic developer solution containing silver ions, the element comprising a water-permeable inert substrate, the substrate having thereon a hydrophilic colloid layer containing physical development nuclei.

2. The silver recovery element of claim 1, wherein the element is a flow-through filter, the filter comprising a cylinder having a hollow core therethrough, the cylinder having an outer surface and an inner surface and having flow channels therethrough, and the outer surface having thereon the substrate.

3. The silver recovery element of claim 3, wherein the substrate is string and the string is positioned on the outer surface of the cylinder.

4. The silver recovery element of claim 3, wherein the string is cotton, and the physical development nuclei is Carey Lea silver in an amount of from about 1 mg silver per gram of string to about 10 mg silver per gram of string.

5. The silver recovery element of claim 4, wherein the physical development nuclei is Carey Lea silver in an amount of about 4 mg silver per gram of string.

6. The silver recovery element of claim 1, wherein the element is a flow-through filter, the filter comprising a cylinder having a hollow core therethrough, the cylinder having an outer surface and an inner surface and having flow channels therethrough, and wherein the substrate is positioned in the hollow core.

7. The silver recovery element of claim 6, wherein the substrate is string.

8. The silver recovery element of claim 7, wherein the string is cotton and the physical development nuclei is Carey Lea silver in an amount of from about 1 mg silver per gram of string to about 10 mg silver per gram of string.

9. The silver recovery element of claim 8, wherein the physical development nuclei is Carey Lea silver in an amount of about 4 mg silver per gram of string.

10. The silver recovery element of claim 1, wherein the hydrophilic colloid layer is gelatin.

11. The silver recovery element of claim 1, wherein the physical development nuclei is nickel sulfide.

12. The silver recovery element of claim 1, wherein the element is a flow-through filter, the filter comprising a cylinder having a hollow core therethrough, the cylinder having an outer surface and an inner surface and having flow channels therethrough, and the outer surface having thereon the substrate, and wherein the substrate is string, the hydrophilic layer further comprises a hardener, and the physical development nuclei comprises nickel sulfide in a weight proportion in the range of from about 5 to about 800 micrograms nickel sulfide per gram of string.

13. The silver recovery element of claim 12, wherein the weight proportion of nickel sulfide is in the range of from about 30 to about 120 micrograms nickel sulfide per gram of string.

14. The silver recovery element of claim 13, wherein the hydrophilic layer comprises gelatin.

15. The silver recovery element of claim 1, wherein the physical development nuclei is Carey Lea Silver having an average pretreatment diameter in the range of from about 10 Å to about 500 Å.

16. The silver recovery element of claim 1, wherein the hydrophilic colloid layer contains a hardener.

17. The silver recovery element of claim 1, wherein the solution contains a hardener.

18. The silver recovery element of claim 1, wherein the solution is a seasoned photographic developer solution.

19. The silver recovery element of claim 1, wherein the element is positioned inside a housing, the housing having an inlet port and an outlet port for respectively providing the solution to and discharging the solution from the housing.

20. A process for recovering silver from a photographic developer solution containing silver ions, the process comprising contacting the solution with a silver recovery element, the element comprising a water-permeable inert substrate, the substrate having thereon a hydrophilic colloid layer containing physical development nuclei; and the contacting being for a time sufficient to reduce the concentration of silver in the solution to a desired level.

21. The process of claim 20, wherein the element is a flow-through filter, the filter comprising a cylinder having a hollow core therethrough, the cylinder having an outer surface and an inner surface and having flow channels therethrough, and the outer surface having thereon the substrate.

22. The process of claim 21, wherein the substrate is string and the string is positioned on the outer surface of the cylinder.

23. The process of claim 22, wherein the string is cotton and the physical development nuclei is Carey Lea silver in an amount of from about 1 mg silver per gram of string to about 10 mg silver per gram of string.

24. The process of claim 23, wherein the physical development nuclei is Carey Lea silver in an amount of about 4 mg silver per gram of string.

25. The process of claim 20, wherein the element is a flow-through filter, the filter having a hollow core therethrough, the cylinder having an outer surface and an inner surface and having flow channels therethrough, and wherein the substrate is positioned in the hollow core.

26. The process of claim 25, wherein the substrate is string.

27. The process of claim 26, wherein the string is cotton and the physical development nuclei is Carey Lea silver in an amount of from about 1 mg silver per gram of string to about 10 mg silver per gram of string.

28. The process of claim 27, wherein the physical development nuclei is Carey Lea silver in an amount of about 4 mg silver per gram of string.

29. The process of claim 20, wherein the hydrophilic colloid layer is gelatin.

30. The process of claim 20, wherein the physical development nuclei is Carey Lea Silver having an average pretreatment diameter in the range of from about 10 Å to about 500 Å.

31. The process of claim 20, wherein the physical development nuclei is nickel sulfide.

32. The process of claim 20, wherein the element is a flow-through filter, the filter comprising a cylinder having a hollow core therethrough, the cylinder having an outer surface and an inner surface and having flow channels therethrough, and the outer surface having thereon the substrate, and wherein the substrate is string, the hydrophilic layer further comprises a hardener, and the physical development nuclei comprises nickel sulfide in a weight proportion in the range of from about 5 to about 800 micrograms nickel sulfide per gram of string.

33. The silver recovery element of claim 32, wherein the weight proportion of nickel sulfide is in the range of from about 30 to about 120 micrograms nickel sulfide per gram of string.

34. The process of claim 33, wherein the hydrophilic colloid layer comprises gelatin.

35. The process of claim 20, wherein the solution contains a hardener.

36. The process of claim 20, wherein the solution is a seasoned photographic developer solution.

37. In a photographic developer recirculating system having a developer tank and a recirculating pump, the improvement wherein the developer system further comprises a silver recovery element comprising a flow-through filter, the filter comprising a cylinder having a hollow core therethrough, the cylinder having an outer surface and an inner surface and having flow channels therethrough, the outer surface having thereon a water-permeable substrate, and the substrate having thereon a hydrophilic colloid layer containing physical development nuclei.

38. The photographic developer recirculating system of claim 37, wherein the substrate is string and the string is positioned on the outer surface of the cylinder.

39. The photographic developer recirculating system of claim 38, wherein the string is cotton and the physical development nuclei is Carey Lea silver in an amount of from about 1 mg silver per gram of string to about 10 mg silver per gram of string.

40. The photographic developer recirculating system of claim 39, wherein the physical development nuclei is Carey Lea silver in an amount of about 4 mg silver per gram of string.

41. The photographic developer recirculating system of claim 38, wherein the hydrophilic colloid layer further comprises a hardener, and the physical development nuclei comprises nickel sulfide in a weight proportion in the range of from about 5 to about 800 micrograms nickel sulfide per gram of string.

42. The photographic developer recirculating system of claim 41, wherein the weight proportion of nickel sulfide is in the range of from about 30 to about 120 micrograms nickel sulfide per gram of string.

43. The photographic developer recirculating system of claim 42, wherein the element is positioned inside a housing, the housing having an inlet port and an outlet port for respectively providing a solution to and discharging a solution from the housing.

* * * * *

UNITED STATES PATENT AND TRADEMARK OFFICE
CERTIFICATE OF CORRECTION

PATENT NO. : 5,310,629
DATED      : May 10, 1994
INVENTOR(S) : Hugh G. Mcguckin et al.

It is certified that error appears in the above-identified patent and that said Letters Patent are hereby corrected as shown below:

Claim 3, col. 13, line 52 should read:   --claim 2,--

Signed and Sealed this

Twenty-third Day of August, 1994

Attest:

BRUCE LEHMAN

Attesting Officer          Commissioner of Patents and Trademarks